US007761700B2

(12) United States Patent
Sierra et al.

(10) Patent No.: US 7,761,700 B2
(45) Date of Patent: Jul. 20, 2010

(54) METHODS AND ARRANGEMENTS FOR PROVIDING A MARK-UP LANGUAGE BASED GRAPHICAL USER INTERFACE FOR USER IDENTIFICATION TO AN OPERATING SYSTEM

(75) Inventors: Giampiero M. Sierra, Seattle, WA (US); Christopher A. Evans, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 11/186,844

(22) Filed: Jul. 20, 2005

(65) Prior Publication Data

US 2005/0257042 A1 Nov. 17, 2005

Related U.S. Application Data

(63) Continuation of application No. 09/539,231, filed on Mar. 30, 2000, now Pat. No. 6,968,449.

(60) Provisional application No. 60/170,955, filed on Dec. 15, 1999.

(51) Int. Cl.
*H04L 9/00* (2006.01)
(52) U.S. Cl. ............................................. 713/2; 726/2
(58) Field of Classification Search ............. 705/66–67, 705/72–73, 18; 713/1–2, 161, 183–185; 726/2–5, 17, 21, 27–30; 709/220–225, 227–229; 725/11, 25, 30
See application file for complete search history.

(56) References Cited

U.S. PATENT DOCUMENTS

| | | | |
|---|---|---|---|
| 5,757,920 A | 5/1998 | Misra et al. | |
| 5,898,835 A | 4/1999 | Truong | |
| 5,909,602 A | 6/1999 | Nakai et al. | |
| 5,919,257 A | 7/1999 | Trostle | |
| 5,960,432 A | 9/1999 | Werner | |
| 5,974,135 A | 10/1999 | Breneman et al. | |
| 6,026,388 A | 2/2000 | Liddy et al. | |
| 6,081,893 A * | 6/2000 | Grawrock et al. | ........... 713/183 |
| 6,247,052 B1 | 6/2001 | Huang et al. | |
| 6,266,695 B1 | 7/2001 | Huang et al. | |
| 6,326,836 B1 | 12/2001 | Kipnis | |
| 6,359,894 B1 | 3/2002 | Hong et al. | |
| 6,373,498 B1 | 4/2002 | Abgrall | |

(Continued)

FOREIGN PATENT DOCUMENTS

EP 0961202 A1 12/1999

(Continued)

*Primary Examiner*—Kimyen Vu
*Assistant Examiner*—Leynna T Truvan
(74) *Attorney, Agent, or Firm*—Lee & Hayes, PLLC

(57) ABSTRACT

Methods and arrangements are provided that can be used to identify users to an operating system during initialization through an advanced graphical user interface (GUI). The resulting GUI can be visually compelling and functional while advantageously remaining easy for the developer to create, maintain and modify. A markup language rendering engine is loaded substantially near the beginning of an operating system initialization procedure, and provided with markup language code that solicits at least one user input associated with a user logon process when rendered by the markup language rendering engine. The markup language code can be written in Hypertext Markup Language (HTML), Dynamic HTML, eXtensible Markup Language (XML), eXtensible Hypertext Markup Language (XHTML), Standard Generalized Markup Language (SGML), etc.

17 Claims, 3 Drawing Sheets

U.S. PATENT DOCUMENTS

| | | | |
|---|---|---|---|
| 6,405,312 B1 | 6/2002 | Ly | |
| 6,408,389 B2 | 6/2002 | Grawrock et al. | |
| 6,418,466 B1 | 7/2002 | Bertram et al. | |
| 6,434,700 B1 | 8/2002 | Alonso et al. | |
| 6,438,580 B1 | 8/2002 | Mears et al. | |
| 6,553,393 B1 * | 4/2003 | Eilbott et al. | 715/207 |
| 6,567,920 B1 | 5/2003 | Cromer et al. | |
| 6,628,314 B1 | 9/2003 | Hoyle | |
| 6,643,690 B2 | 11/2003 | Duursma et al. | |
| 6,686,934 B1 | 2/2004 | Evans et al. | |
| 6,754,826 B1 | 6/2004 | Challener et al. | |
| 6,757,723 B1 | 6/2004 | O'Toole et al. | |
| 6,771,290 B1 | 8/2004 | Hoyle | |
| 6,862,010 B2 | 3/2005 | Nicolas et al. | |

FOREIGN PATENT DOCUMENTS

WO    WO 99/09658    2/1999

* cited by examiner

METHODS AND ARRANGEMENTS FOR PROVIDING A MARK-UP LANGUAGE BASED GRAPHICAL USER INTERFACE FOR USER IDENTIFICATION TO AN OPERATING SYSTEM

RELATED APPLICATION

This application is a continuation of and priority is claimed to co-pending U.S. patent application Ser. No. 09/539,231 and a filing date of Mar. 30, 2000 for "Methods And Arrangements For Providing A Mark-Up Language Based Graphical User Interface For User Identification To An Operating System" of Sierra et al., which claims priority from U.S. Provisional Application Ser. No. 60/170,955, filed Dec. 15, 1999, entitled "Web-Based User Interface For User Identification To The Operating System", express mailing label number EL425348720US). This co-pending non-provisional United States Patent Application is commonly assigned herewith and is hereby incorporated herein by reference for all that it discloses.

BACKGROUND

Computer systems are often protected by a logon program and/or other subsequent authentication programs that determine whether a user has permission to access certain computer system resources. By way of example, a networked computer may require that a user input a valid user name and password before the user is allowed to access network resources. Similarly, a Web site on the World Wide Web (WWW) portion of the Internet or on an intranet may require a valid user ID and password before the user is allowed to gain further access to various resources.

Controlling user access is not limited to networked computers. A single computer that is accessed by several users may also need to limit access to files and/or various programs therein. Thus, for example, in a home environment, a parent may decide to limit a child's access to the computer entirely, certain programs and/or certain data. Similarly, in a business environment, certain users may have limited access.

Controlling access to computers as described above is well known. Typically, there is an initial logon program or the like that requests user input, receives the user input and determines if the user is allowed access. Once the user has been authenticated, then other programs are allowed to operate. For example, in a networked operating system environment, during the booting-up of a personal computer (PC) or like device connected to the network, the user is typically presented with a modal dialog requesting a user name and associated password. In this example, the modal dialog is displayed by the network's logon program. For a single PC, a logon program associated with the operating system may display a similar modal dialog.

In either case, the modal dialog tends to be tightly integrated within the logon program code of the network software and/or operating system software. As a result, it is often difficult and expensive to significantly alter the modal dialog or otherwise to introduce new functional and nonfunctional features, such as those typically associated with conventional graphical user interfaces (GUIs).

Thus, there is need for improved methods and arrangements that provide enriched techniques for identifying users to an operating system. Preferably, the methods and arrangements will allow for a more advanced GUI to be presented to the user, while also remaining easy for the developer to maintain and modify.

SUMMARY

The present invention includes various methods and arrangements that can be implemented to identify users to an operating system through an advanced graphical user interface (GUI). The resulting GUI can be visually compelling and functional while advantageously remaining easy for the developer to create, maintain and modify.

Thus, for example, the above stated needs and others are met by a method that includes arranging for a markup language rendering engine to be loaded substantially near the beginning of an operating system initialization procedure, and providing markup language code suitable for use with the markup language rendering engine. The markup language is capable of soliciting at least one user input associated with a user logon process when rendered by the markup language rendering engine.

With the above example in mind, in accordance with certain implementations, a logon screen, for example, can be rendered from code written in Dynamic HTML (Hypertext Markup Language), eXtensible Markup Language (XML), eXtensible Hypertext Markup Language (XHTML), Standard Generalized Markup Language (SGML), or the like.

For the logon screen to be most effective upon initializing the computer, there will usually be a need to render the associated markup language file(s) early during the initialization stage. Accordingly, in certain implementations, the markup language rendering engine is loaded very near the beginning of the initialization of the operating system.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
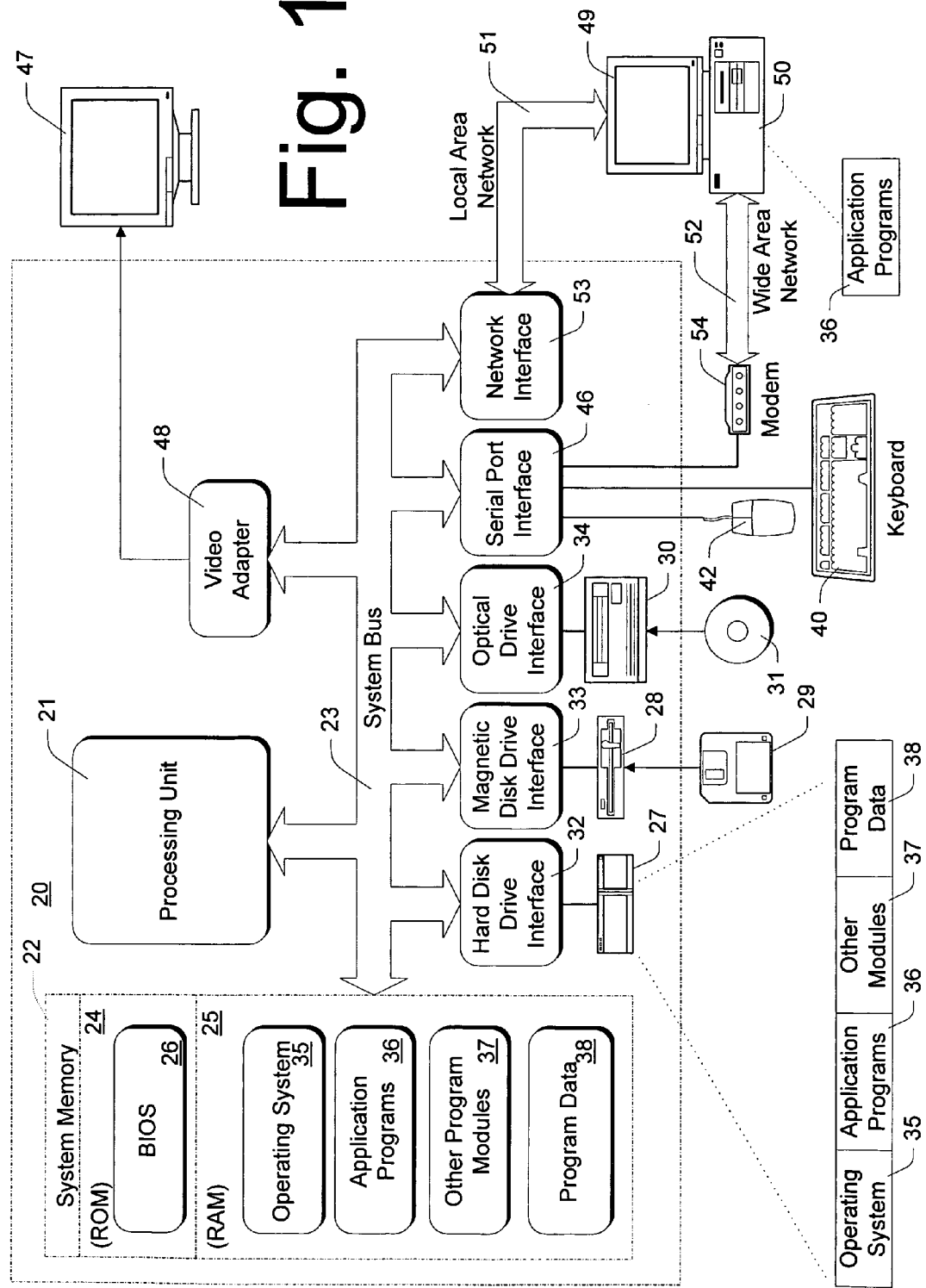
FIG. 1 is a block diagram depicting an exemplary computer system.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
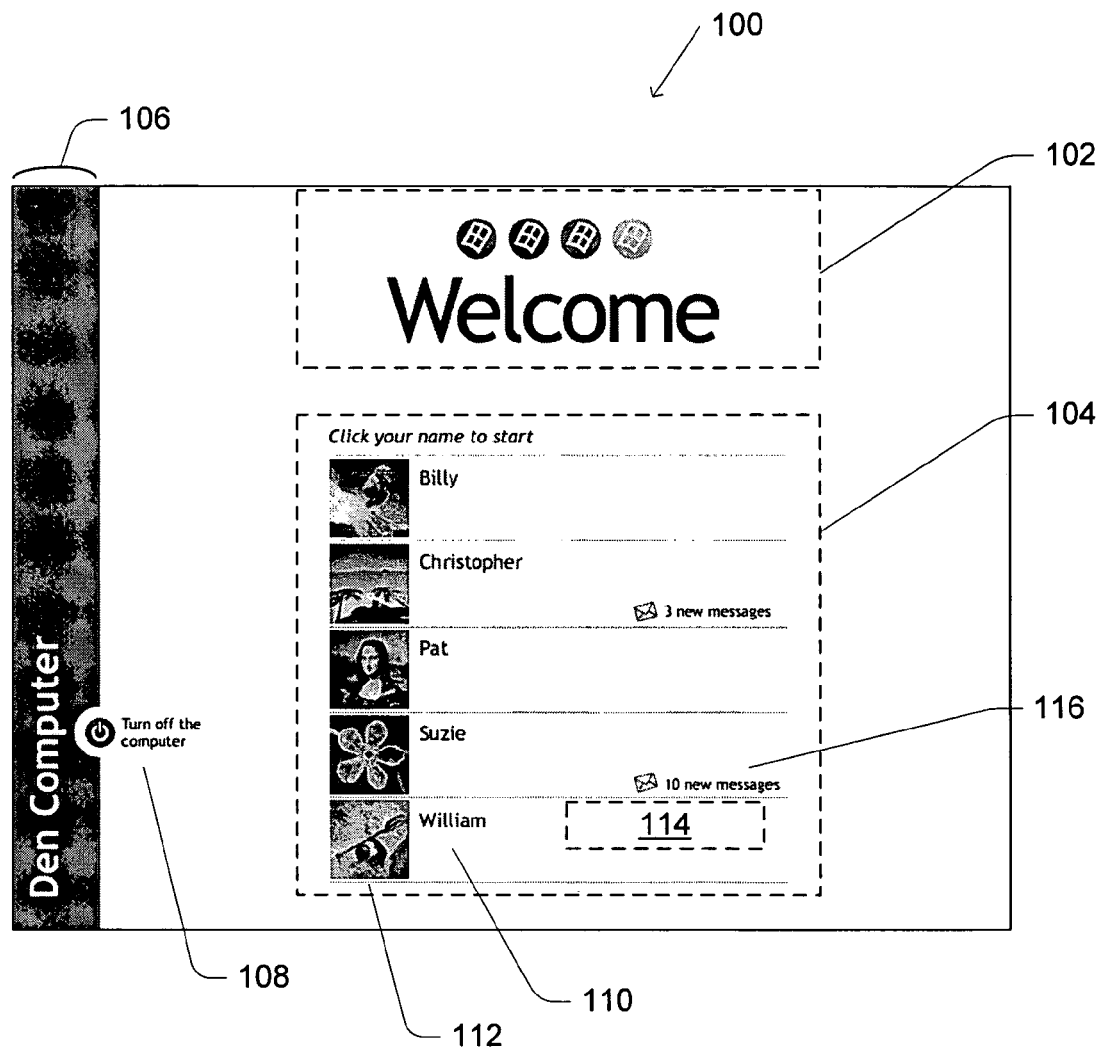
FIG. 2 depicts an exemplary mark-up language based graphical user interface suitable for use in the computer system of FIG. 1 in identifying users to the operating system.

Reference is now made to FIG. 2, which depicts an exemplary mark-up language based graphical user interface (GUI) display suitable for use in identifying users to the operating system of computer 20. Here, a logon screen 100 is shown as having a first title area 102 that identifies logon screen 100. Logon screen 100 may take up be a full screen of display 47 or a portion thereof. As shown, first title area 102 can include any graphical feature (e.g., bitmap, photo, video, text, etc.).

Logon screen 100 also includes a single/multiple user logon area 104 wherein the user is presented with selectable user identifiers and related information and permitted to input certain data. In this example, logon area 104 is configured for five different users, namely, Billy, Christopher, Pat, Suzie, and William; each being identified by a text identifier 110 and graphical identifier 112. Thus, William may begin logging on to the operating system by selecting either text identifier 110 or graphical identifier 112. If William has an established password, then a password input field 114 is displayed and configured to receive his input (i.e., password). Once William's password has been authenticated then William is logged on. If William does not have an established password, then he would be logged on after selecting text identifier 110 or graphical identifier 112.

Logon screen 100 can also be configured to display other user related information 116 to a user. In this example, user related information 116 identifies that Suzie has ten (10) new messages.

A second title area 106 is shown in this example along the left hand border of logon screen 100. Here, second title area 106 identifies the computer as the "Den Computer". A selectable shut down mechanism 108 is also provided to allow a user to shut down the computer.

With the above example in mind, in accordance with certain implementations, logon screen 100 is a mark-up language based GUI. For example, a Dynamic HTML (Hypertext Markup Language) can be used to create logon screen 100. Dynamic HTML provides a mechanism to include a wide variety of functional as well as non-functional features to logon screen 100. Other types of mark-up languages and the like may also be used to define logon screen 100. For example, eXtensible Markup Language (XML), eXtensible Hypertext Markup Language (XHTML) or Standard Generalized Markup Language (SGML) may be used.

For logon screen 100 to be effective upon initializing computer 20, there is a need to render the associated markup language file(s) early during the initialization stage. Accordingly, a markup language rendering engine (i.e., program) is loaded very near the beginning of the initialization of the operating system. Such rendering engines are well known. An exemplary markup language rendering engine is provided within Microsoft Internet Explorer (IE).

Dynamic HTML allows developers to create very attractive and colorful user interfaces. Thus, logon screen 100 may incorporate graphics and animations easily, while scripting complex behaviors, such as defining what happens when a user clicks on their name. The logon screen can be multilayered and scaled to work with different resolutions. Additionally, complex graphical visual effects, such as, e.g., alpha blending, can be employed to create fades and transparencies that would be very difficult to implement in a traditional modal dialog interface.

By using a markup language and preloading the markup language rendering engine in the logon context, developers can advantageously prototype and generate dynamic user interfaces quickly and at a lower cost than would be required to significantly modify a conventional modal dialog. Thus, conceivably, each computer may have its own custom logon screen.

Figure 3:
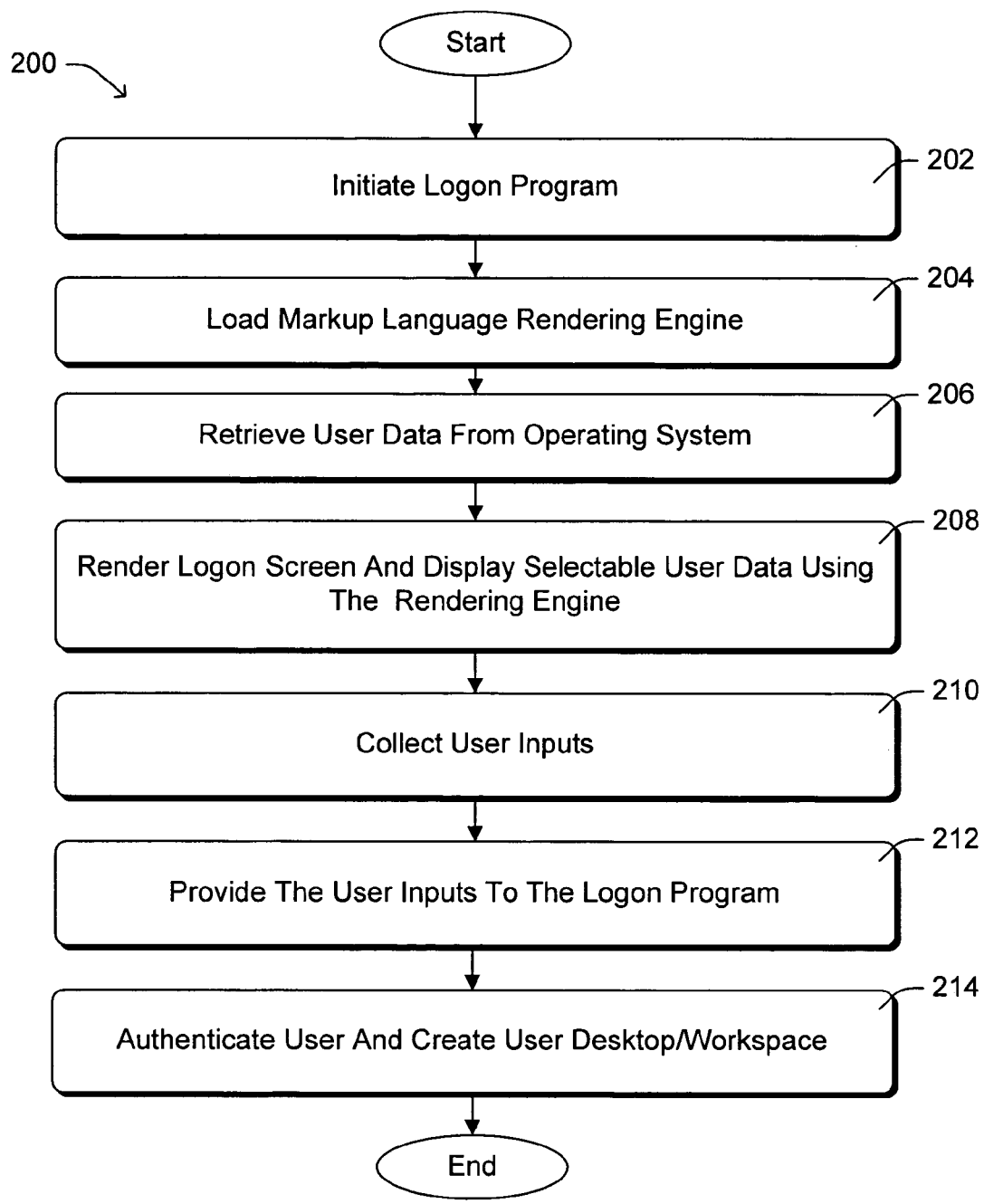
FIG. 3 is a flowchart depicting an exemplary process for identifying users to the operating system using a mark-up language based graphical user interface.

Having the ability to rapidly create and prototype logon screen designs will also make it easy for users to agree on what they like. For example, by changing the Cascading Style Sheets (CSS) and Dynamic HTML templates, developers can quickly change the logon screen without affecting the logon program code Reference is now made to FIG. 3, which is a flowchart depicting an exemplary process 200 for identifying users to the operating system using a mark-up language based GUI.

In step 202, the logon program is initiated. This would occur upon rebooting computer 20, for example. Next, in step 204, a separate process, having a markup language rendering engine, is spawned to host the markup language content.

In step 206, the separate process retrieves user data from the operating system or elsewhere. The user data can include a listing of users, associated text identifiers 110, graphical identifiers 112, a password enabled identifier, and possibly, a password hint data (if enabled). Next, in step 208, the markup language rendering engine displays logon screen 100 along with applicable portions of the user data.

In step 210 the markup language rendering engine collects user inputs. This can include user mouse clicks, user typed text, audio commands, and/or other acceptable forms of user input. In the example of FIG. 2, William would select text identifier 110 or graphical identifier 112. Assuming that William has established a password (i.e., password is enabled), then he would need to enter his password.

Next, in step 212, the user inputs (e.g., user name and password) are provided to the logon program. In step 214, the logon program attempts to authenticate the user. If the user is authenticated, then a user desktop and/or workspace is created and subsequently displayed on display 47. If the user is not authenticated in step 214, then process 200 would return to either step 208, step 210, or otherwise handle the failed attempted logon.

Process 200 can be implemented, for example, within a Microsoft Windows operating system environment using Dynamic HTML and available interfaces. Thus, a logon process, known as WinLogon, spawns a separate process to host the Dynamic HTML content. When WinLogon launches the separate process, it provides a mechanism to communicate with WinLogon so that the HTML interface can ask WinLogon to authenticate the user and start their desktop session. The Dynamic HTML code then makes calls to an ActiveX control or like applet that communicates with the operating system to determine the list of users, the picture to associate with the user, a password hint if one was configured by the user and whether the user has a password configured. The user then selects their picture or name, for example, and types in their password (if needed), after which the HTML code calls the ActiveX control with the user name and password. The ActiveX control then passes this information back to WinLogon where the authentication takes place. If the user is authenticated, then WinLogon creates the user's desktop and switches to it. At this point, the Dynamic HTML process is finished. Thereafter, the rendering engine may remain loaded or may be terminated.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A system comprising means for:
   a memory;
   a processor coupled to the memory to perform acts comprising:
   while booting a computer and prior to allowing a user to logon to the computer, spawning a process, separate from a user logon process, arranging for a markup language rendering engine to be loaded at the beginning of an operating system initialization procedure;
   providing markup language code suitable for use with the markup language rendering engine, the markup language being capable of soliciting at least one user input when rendered by the markup language rendering engine, the user input being associated with the user logon process configured to selectively allow the user to logon to the computer; and
   providing a control permitting the markup language rendering engine to communicate with the user logon process, wherein the markup language rendering engine makes calls to the control which passes the calls to the user logon process.

2. The system of claim 1, wherein the means for providing the markup language code further comprises means for providing user data, the user data being operatively associated with the user logon process.

3. The system of claim 2, wherein the user data includes data selected from a set comprising a list of users, a text identifier, a graphical identifier, a password enabled identifier, and password hint data, and related user information data.

4. The system of claim 2, further comprising means for configuring the markup language rendering engine to display at least a portion of the user data based on the markup language code.

5. The system of claim 1, further comprising means for configuring the markup language code to provide the user input to an authorization entity for validation determination.

6. The system of claim 1, wherein the user input includes at least one input selected from a group of inputs comprising a user name, a user identifier, or a password.

7. The system of claim 1, wherein the markup language code includes markup language code selected from at least one markup language in a group comprising hypertext markup language (HTML), Dynamic Hypertext Markup Language (DHTML), eXtensible Markup Language (XML), eXtensible Hypertext Markup Language (XHTML), or Standard Generalized Markup Language (SGML).

8. One of more computer-readable media embodying computer-readable instructions which, when executed, perform acts comprising:
   while booting a computer and prior to allowing a user to logon to the computer, spawning a process, separate from a user logon process, for loading markup language rendering engine at the beginning of an operating system initialization procedure;
   retrieving user data from an operating system via a control that permits the markup language rendering engine to make calls to and communicate with the user logon process;
   rendering markup language code associated with a logon screen configured to selectively allow a user to logon to the computer using at least a portion of the user data;
   collecting at least one user input associated with the logon screen; and
   establishing a logon session if the user input is valid.

9. The media of claim 8, wherein the act of establishing a logon session further comprises:
   providing the user input to the operating system via the control that communicates with the user logon process; and
   causing the operating system to authenticate the user input.

10. The media of claim 9, wherein the act of establishing a logon session further comprises providing the user input to an authorization entity for validation determination.

11. The media of claim 8, wherein the user data comprises data selected from a set comprising a list of users, a text identifier, a graphical identifier, a password enabled identifier, and password hint data, and related user information data.

12. The media of claim 8, wherein the markup language code comprises markup language code selected from at least one markup language in a group comprising hypertext markup language (HTML), Dynamic Hypertext Markup Language (DHTML), eXtensible Markup Language (XML), eXtensible Hypertext Markup Language (XHTML), and Standard Generalized Markup Language (SGML).

13. A computing system comprising:
   one or more processors; and
   one or more computer-readable media having computer-readable instructions thereon which, when executed by the one or more processors, cause the one or more processors to:
      while booting the computing system and prior to allowing a user to logon to the computing system, spawning a process, separate from a user logon process, to load a markup language rendering engine at the beginning of an operating system initialization procedure;
      retrieve user data from the operating system via a control that communicates between the markup language rendering engine and the user logon process;
      render markup language code associated with a logon screen configured to selectively allow a user to logon to the computing system using at least a portion of the user data;
      collect at least one user input associated with the logon screen; and
      establish a logon session if the user input is valid.

14. The computing system of claim 13, wherein establish the logon session further comprises:
   provide the user input to the operating system; and
   cause the operating system to authenticate the user input.

15. The computing system of claim 14, wherein establish the logon session further comprises provide the user input to an authorization entity for validation determination.

16. The computing system of claim 13, wherein the user data comprises data selected from a set comprising a list of users, a text identifier, a graphical identifier, a password enabled identifier, and password hint data, and related user information data.

17. The computing system of claim 13, wherein the markup language code comprises markup language code selected from at least one markup language in a group comprising hypertext markup language (HTML), Dynamic Hypertext Markup Language (DHTML), eXtensible Markup Language (XML), eXtensible Hypertext Markup Language (XHTML), or Standard Generalized Markup Language (SGML).

* * * * *

UNITED STATES PATENT AND TRADEMARK OFFICE
CERTIFICATE OF CORRECTION

| | | |
|---|---|---|
| PATENT NO. | : 7,761,700 B2 | Page 1 of 1 |
| APPLICATION NO. | : 11/186844 | |
| DATED | : July 20, 2010 | |
| INVENTOR(S) | : Giampiero M. Sierra et al. | |

It is certified that error appears in the above-identified patent and that said Letters Patent is hereby corrected as shown below:

In column 6, line 35, in Claim 8, delete "of" and insert -- or --, therefor.

In column 6, line 40, in Claim 8, after "loading" insert -- a --.

Signed and Sealed this
Third Day of May, 2011

David J. Kappos
*Director of the United States Patent and Trademark Office*